United States Patent [19]

Tippett

[11] Patent Number: 5,076,158
[45] Date of Patent: Dec. 31, 1991

[54] NUTCRACKER APPARATUS

[76] Inventor: Raymond O. Tippett, Rte. #1, Box 189B, Kirbyville, Tex. 75956

[21] Appl. No.: 636,208

[22] Filed: Dec. 31, 1990

[51] Int. Cl.$^5$ .............................................. A23N 5/00
[52] U.S. Cl. ........................................ 99/575; 99/574; 99/617
[58] Field of Search ................. 99/568, 570, 574, 575, 99/581, 577, 579, 518, 519, 524, 600–604, 617, 618–622, 632; 426/481, 482, 483

[56] References Cited

U.S. PATENT DOCUMENTS

| | | | |
|---|---|---|---|
| 1,025,405 | 5/1912 | King | 99/575 |
| 1,194,318 | 8/1916 | Power | 99/575 |
| 1,258,125 | 3/1918 | Lambeth | 99/574 |
| 2,144,841 | 1/1939 | Glaser | 99/574 |
| 2,230,790 | 2/1941 | Anderson | 99/574 |
| 2,970,780 | 2/1961 | Bowen | 99/574 |
| 4,003,303 | 1/1977 | Palyi | 99/622 |
| 4,034,665 | 7/1977 | McFarland et al. | 99/625 |
| 4,353,931 | 10/1982 | Volk, Sr. | 426/483 |
| 4,438,688 | 3/1984 | Johnson | 99/618 |
| 4,909,140 | 3/1990 | Burlock et al. | 99/519 |

FOREIGN PATENT DOCUMENTS 2356380  1/1978  France .................................... 99/574

Primary Examiner—Timothy F. Simone
Attorney, Agent, or Firm—Leon Gilden

[57] ABSTRACT

An apparatus wherein a platform mounts an electric drive for selective use and cooperation with a manual crank to rotate a drum supporting shaft to rotate a drum in cooperation with a chute, wherein the chute includes a convex grinding surface to receive members therethrough to grind such members in cooperation with a multi-lobed drum. The drum lobes are optionally provided for selective replacement utilizing lobes of a multi-ribbed construction in cooperation with an initial and primary shell cracking rib.

2 Claims, 5 Drawing Sheets

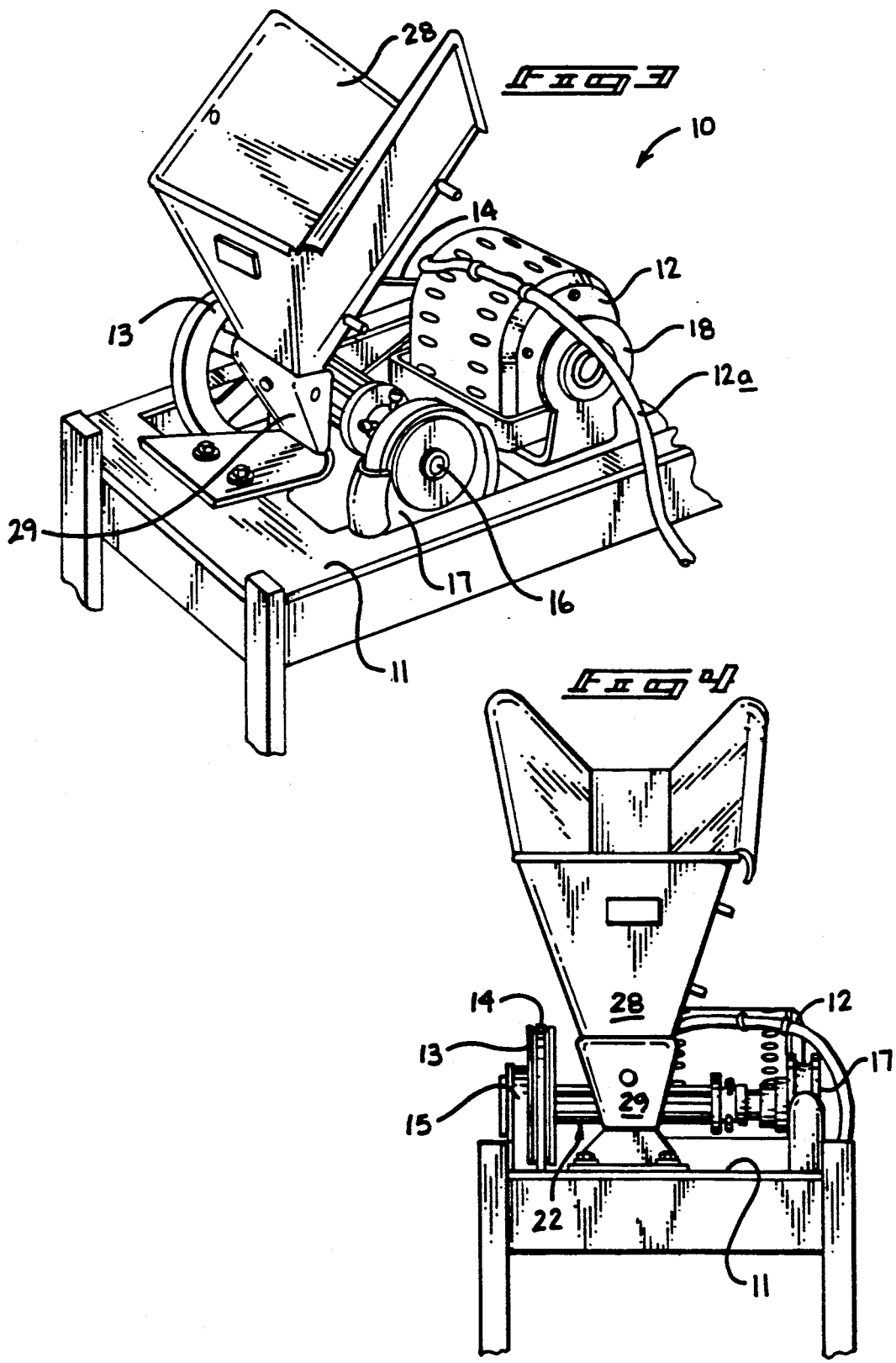

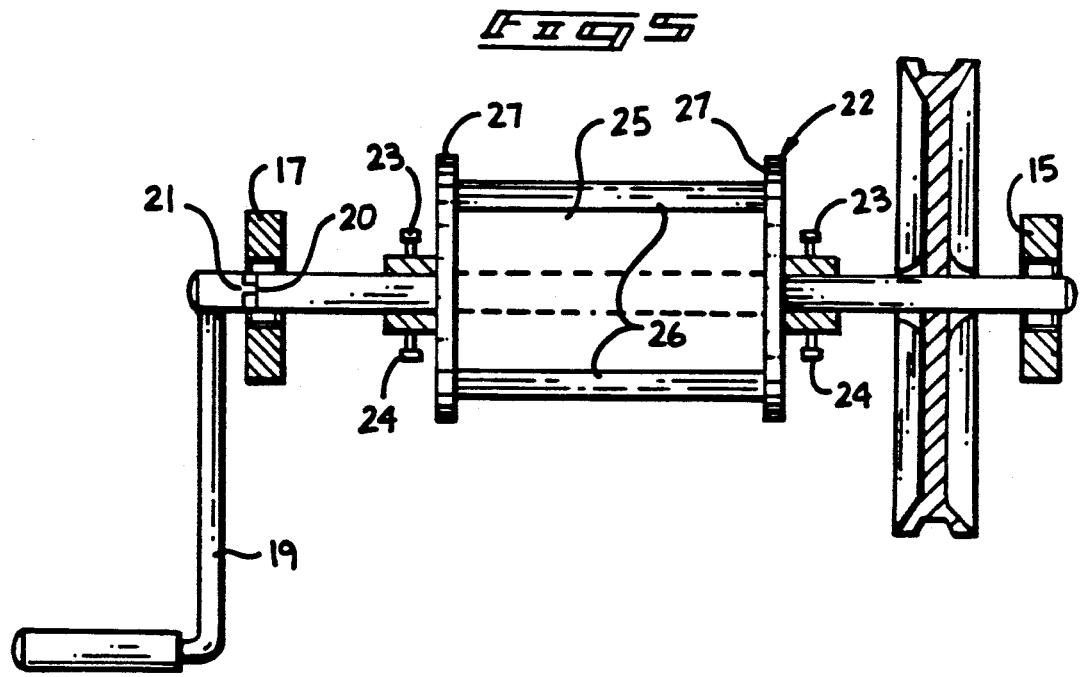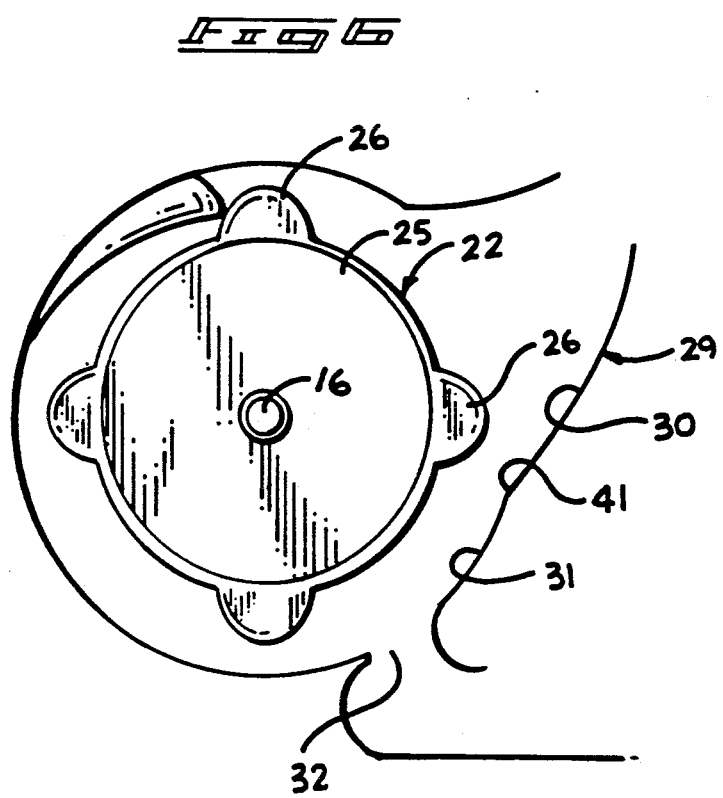

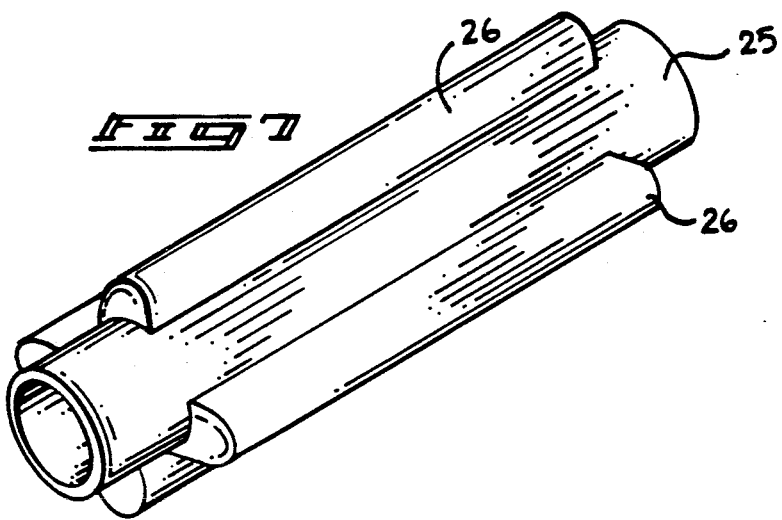
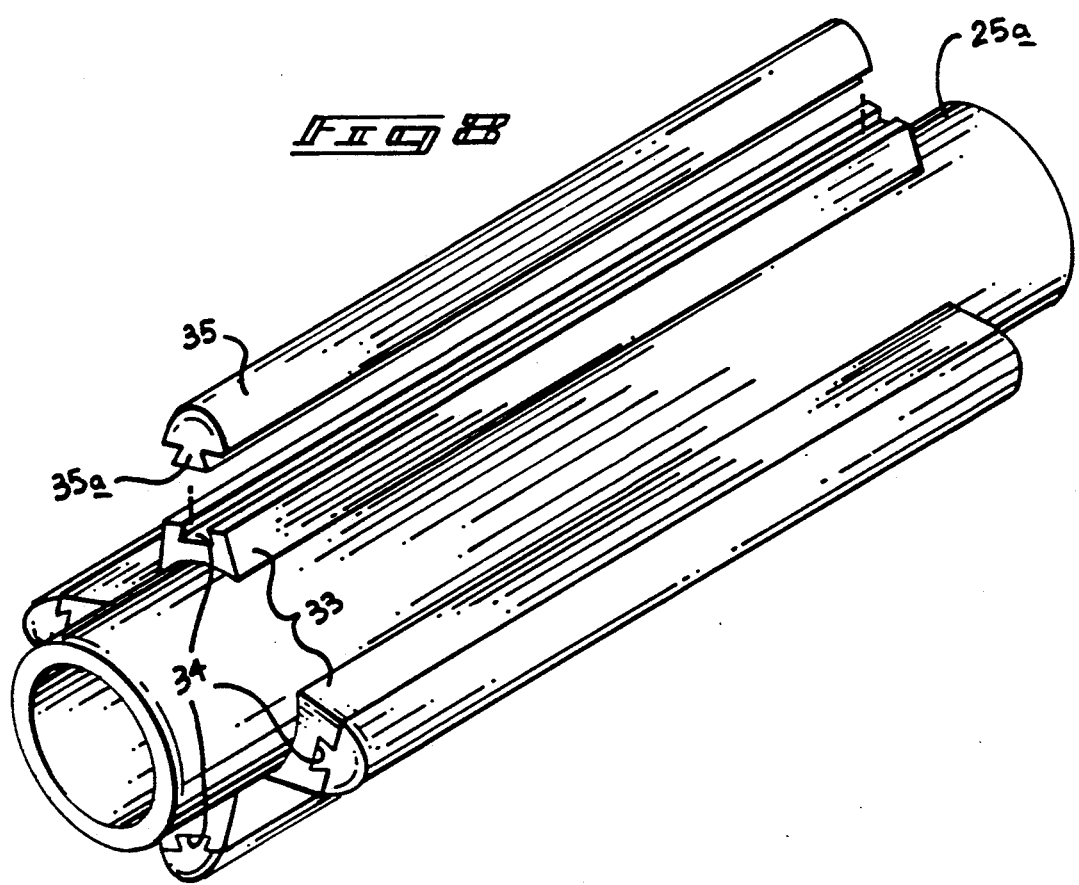

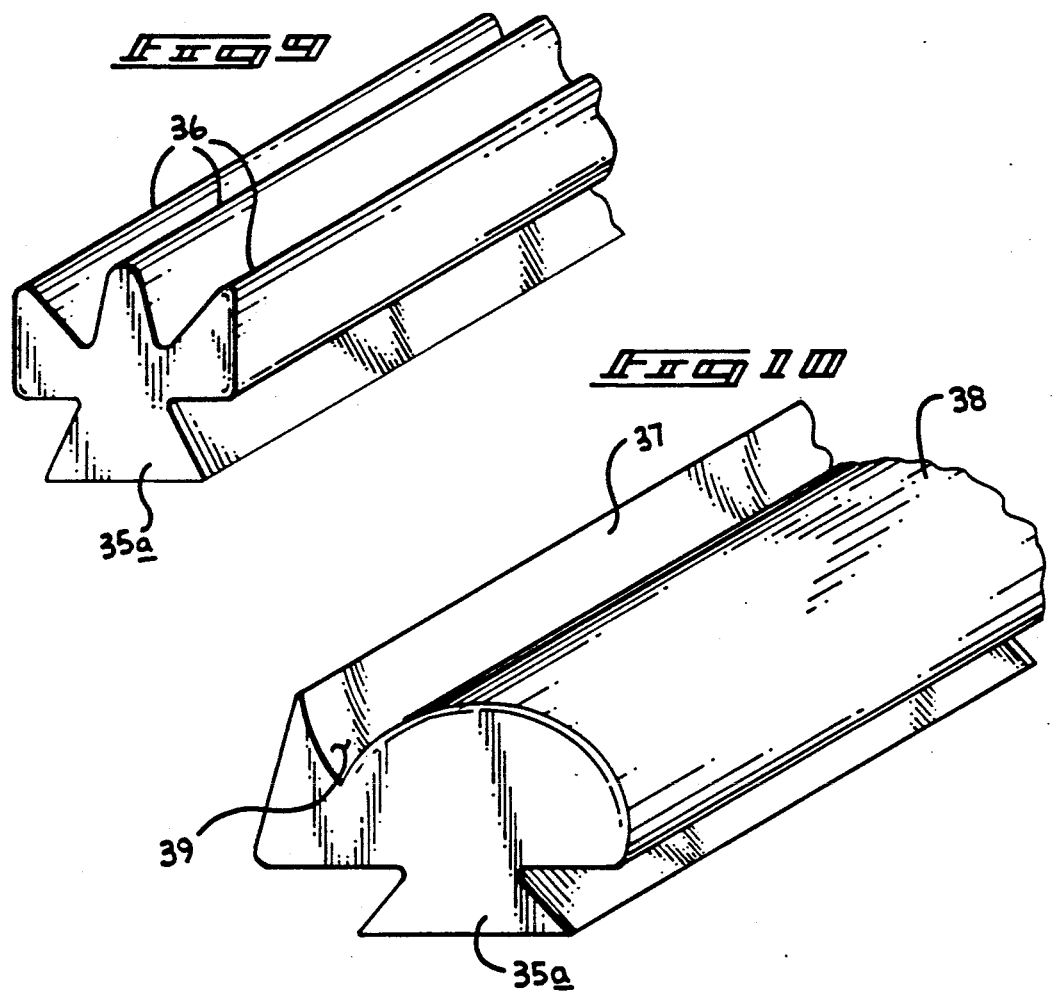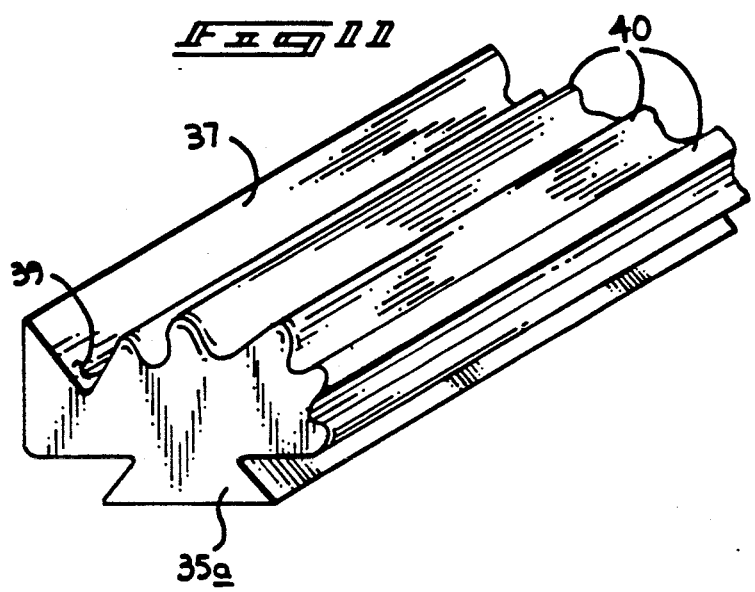

NUTCRACKER APPARATUS

BACKGROUND OF THE INVENTION

1. Field of the Invention

The field of invention relates to nut cracking apparatus, and more specifically pertains to a new and improved nutcracker apparatus wherein the same provides selective manual or electric rotation of a nut cracking drum, and further the drum is provided with selectively replaceable lobes.

2. Description of the Prior Art

The prior art has provided nut cracking apparatus of various configurations, but has heretofore failed to provide a convenient and readily operative organization utilizing a drum structure cooperating with an anvil surface to direct crushing of shell structures as found in nut-type workpieces. Examples of the prior art includes U.S. Pat. No. 4,603,624 to Greenblatt wherein a motorized nutcracker utilizes a reciprocating ram structure to crack associated nuts therebetween.

U.S. Pat. No. 4,848,220 to Burdette, et al. sets forth an electrically powered nut cracker utilizing a cam drive to operate the reciprocating ram to crack members therebetween.

U.S. Pat. No. 4,690,048 to Namdari provides rotatable disks for cracking nut members.

U.S. Pat. No. 665,814 to Harborne, et al. sets forth an impacting nut cracker structure utilizing ram members displaceable to crack nuts therebetween, and similarly U.S. Pat. No. 4,831,733 to Morrow sets forth displaceable rams utilizing solenoid members to effect ram displacement.

As such, it may be appreciated that there continues to be a need for a new and improved nutcracker apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of nutcracker apparatus now present in the prior art, the present invention provides a nutcracker apparatus wherein the same includes a multi-lobed rotary drum to crack nut members in cooperation with a concave chute surface. As such, the general purpose of the present invention, which will be described subsequently in greater detail, is to provide a new and improved nutcracker apparatus which has all the advantages of the prior art nutcracker apparatus and none of the disadvantages.

To attain this, the present invention provides an apparatus wherein a platform mounts an electric drive for selective use and cooperation with a manual crank to rotate a drum supporting shaft to rotate a drum in cooperation with a chute, wherein the chute includes a convex grinding surface to receive members therethrough to grind such members in cooperation with a multi-lobed drum. The drum lobes are optionally provided for selective replacement utilizing lobes of a multi-ribbed construction in cooperation with an initial and primary shell cracking rib.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved nutcracker apparatus which has all the advantages of the prior art nutcracker apparatus and none of the disadvantages.

It is another object of the present invention to provide a new and improved nutcracker apparatus which may be easily and efficiently manufactured and marketed.

It is a further object of the present invention to provide a new and improved nutcracker apparatus which is of a durable and reliable construction.

An even further object of the present invention is to provide a new and improved nutcracker apparatus which is susceptible of a low cost of manufacture with regard to both materials and labor, and which accordingly is then susceptible of low prices of sale to the consuming public, thereby making such nutcracker apparatus economically available to the buying public.

Still yet another object of the present invention is to provide a new and improved nutcracker apparatus which provides in the apparatuses and methods of the prior art some of the advantages thereof, while simultaneously overcoming some of the disadvantages normally associated therewith.

Still another object of the present invention is to provide a new and improved nutcracker apparatus wherein the same utilizes a rotary drum cooperating with nuts directed from an overlying hopper to position nut members in a procession to permit cracking of the nuts in a convenient and expedient manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic frontal view, taken in elevation, of the instant invention.

FIG. 5 is an orthographic diagrammatic illustration of the driven axle and associated cracking drum utilized by the instant invention.

FIG. 6 is an orthographic side view of a cracking drum cooperating with the chute member.

FIG. 7 is an isometric illustration of the nut cracking drum.

FIG. 8 is a modified nut cracking drum utilized by the instant invention.

FIGS. 9, 10, and 11 are isometric illustrations of modified and replacement drum lobes utilized by the modified drum of the instant invention.

DESCRIPTION OF THE PREFERRED EMBODIMENT

Figure 1:
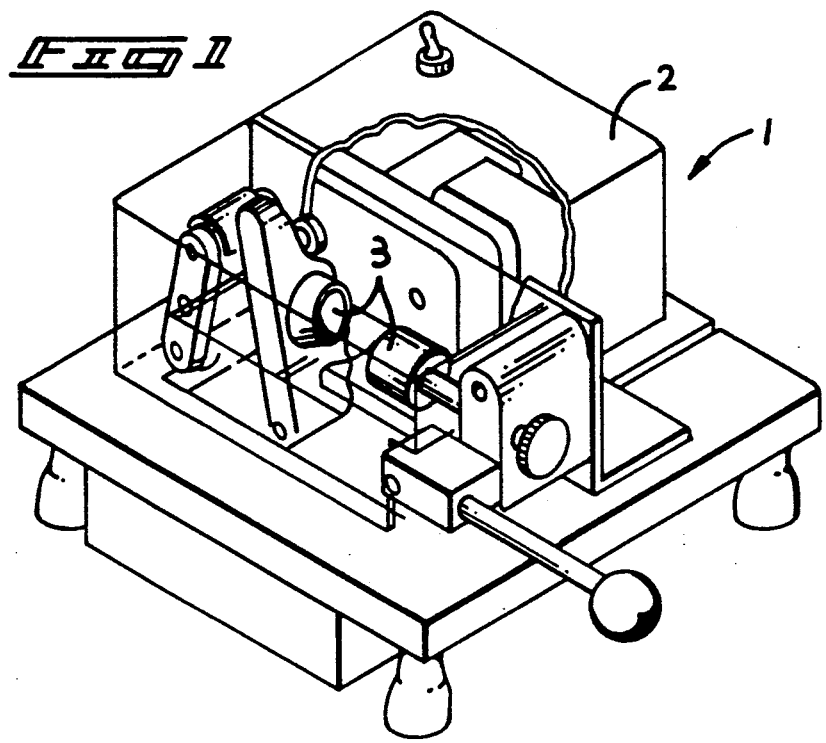
FIG. 1 is an isometric illustration of a prior art nutcracker apparatus.

With reference now to the drawings, and in particular to FIGS. 1 to 11 thereof, a new and improved nutcracker apparatus embodying the principles and concepts of the present invention and generally designated by the reference numeral 10 will be described.

Figure 2:
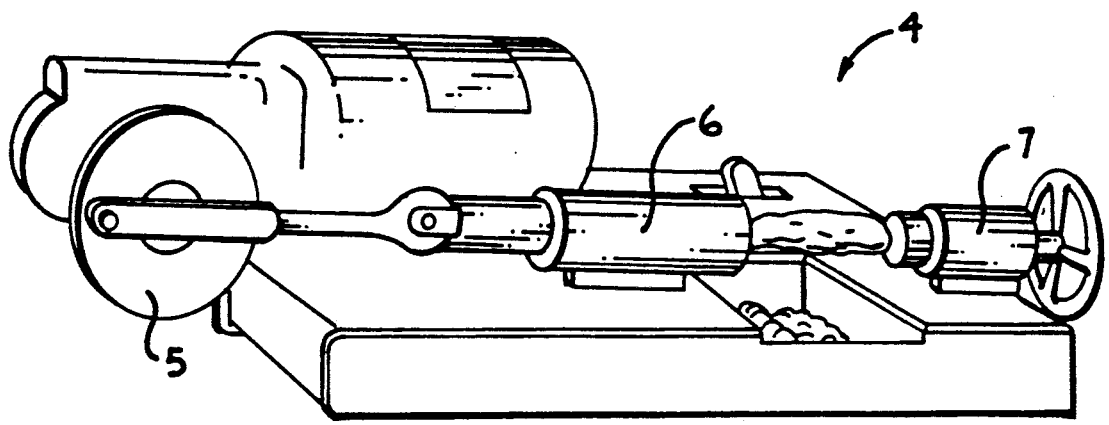
FIG. 2 is an isometric illustration of a further prior art nutcracker apparatus.

FIG. 1 illustrates a prior art nut cracking drum 1, wherein a motor housing 2 effects directing of cooperating anvils 3 to crack nut members therebetween, as set forth in U.S. Pat. No. 4,603,624. FIG. 2 illustrates a further prior art nut cracking drum organization 4, wherein an eccentric 5 directs a first ram 6 against the stationary ram 7, as set forth in U.S. Pat. No. 4,848,220.

More specifically, the nutcracker apparatus 10 of the instant invention essentially comprises a support platform 11, with the support platform 11 including a drive motor 12 mounted thereon, with an electrical supply line 12a directing electrical current to the motor, and the motor mounted within a "U" shaped support bracket 18, with the "U" shaped support bracket fixedly mounted to the top surface of the support platform 11. A driven pulley 13 cooperating with the electrical motor and a drive belt 14 is fixedly mounted to a driven shaft 16 and the driven shaft 16 mounted within a first bearing cage 15 adjacent the driven pulley 13 at one end thereof, and a second bearing cage 17 at spaced other end of the driven shaft 16. The driven shaft 16 including a shaft socket 20 recessed within and coaxially aligned with the other end of the driven shaft 16 cooperating with a crank handle socket projection 21 formed to a crank handle 19 to permit selective manual or motor driven rotation of a driven shaft 16. A cracking drum 22 is fixedly mounted onto the driven shaft 16 and coaxially aligned therewith, with the cracking drum including a plurality of mounting collars 23, one at each axial end of the drum utilizing collar fasteners 24 radially directed through each of the collars to fixedly secure the collars to the shaft 16, in a manner as illustrated in FIG. 5 for example. The cracking drum 22 includes a central drum cylinder 25 mounting a plurality of cracking lobes 26 thereon. The cracking lobes 26 are spaced an equal distance about the surface of the cracking drum 25 and are arranged axially parallel to and offset relative to the central axis of the cracking drum 22 coincident with the driven shaft 16. A plurality of drum end plates 27 are fixedly mounted coaxially to each end of the central drum cylinder 25. A hopper 28 positioned overlying the cracking drum 22 directs a plurality of nut members into a directing chute 29 in communication with the hopper, with the directing chute 29 including a chute concave interior upper directing surface 30 to receive the nut members along the inner chute surface and direct the nuts therefrom to a chute concave lower cracking surface 31 underlying the upper surface to define a ridge 41 between the upper and lower surfaces to enhance cracking of the nuts by the cracking lobes 26 of the cracking drum 22. Thereafter, the nuts are directed through the outlet 32 underlying the chute 29.

FIG. 8 illustrates the use of a modified central drum cylinder 25a, including a plurality of lobe support rails 33 each parallel and equally spaced relative to one another and axially offset relative to a central axis of the member 25, and each including a dove tailed elongate groove 34 coextensive with each rail to receive modified lobes 35 that include dove tail projections of a length equal to that of each of the grooves and are complimentarily received within each of the grooves. It is noted that the dove tail projections and the grooves are each of a generally trapezoidal cross-sectional configuration, as illustrated. FIG. 9 illustrates the use of a modified lobe organization utilizing a plurality of spaced parallel ribs, wherein the lobes are of a generally flexible construction and enhances the cracking of the nut members. The lobe members, as illustrated in FIG. 10, sets forth the use of a primary cracking rib 37 positioned in a leading orientation as rotated in cooperation with the directing chute 29 and engages a nut member initially along the rib 41 and thereafter effects grinding of the nut member by the arcuate concave lobe 38 separated from the primary rib 37 by a primary groove 39. The lobe structure, as seen in FIG. 11, utilizes the primary cracking rib 37 separated from an arcuate array of grinding ribs 40 that are of a radially height less than that of the primary rib 39 separated from the primary rib 39 by the primary groove 39 to ensure cracking of nuts with shells of greater resistance to a cracking operation.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A nutcracker apparatus comprising, in combination, a support platform, the support platform including a drive motor fixedly mounted to the support platform, and a driven shaft spaced from the drive motor, and a driven pulley mounted to the driven shaft and a drive belt in operative association with the drive motor and the driven shaft to effect selective rotation of the driven shaft, and the driven shaft including a first end and a second end, with a first bearing cage mounted adjacent the first end and a second bearing cage mounted adjacent the second end, and a cracking drum fixedly and coaxially mounted to the driven shaft, and a directing chute positioned adjacent the cracking drum to effect cracking of nut members between the cracking drum and the directing chute upon rotation of the driven shaft, and wherein the second end of the driven shaft includes a socket recess, and a crank handle including a socket projection selectively positionable within the socket recess to effect manual rotation of the driven shaft selectively relative to the drive motor, and wherein the cracking drum includes a central drum cylinder, the central drum cylinder including a plurality of cracking lobes mounted over the central drum cylinder, the cracking lobes arranged parallel and equally spaced relative to one another, and parallel to the driven shaft, and wherein the directing chute includes a concave upper surface in confronting relationship relative to the cracking drum and a concave lower surface spaced below the concave upper surface, with a cracking rib defined between the upper surface and lower surface coaxially aligned with the cracking drum, and wherein each of the cracking lobes includes an elongate lobe support rail, each lobe support rail includes an elongate dove tail groove coextensive with each lobe support rail defined by a predetermined length, and a lobe projection member including an upper lobe surface, wherein each upper lobe surface includes a dove tail projection receivable within each groove and each dove tail projection defined by a predetermined length.

2. An apparatus as set forth in claim 1 wherein each upper surface includes a primary cracking rib, and the primary cracking rib defined by a predetermined height, and an arcuate array of grinding ribs defined by a further height less than the predetermined height arranged parallel relative to one another and to the primary cracking rib, and spaced from the primary cracking rib by a primary groove.

* * * * *